US006868257B1

(12) United States Patent
Holma

(10) Patent No.: US 6,868,257 B1
(45) Date of Patent: Mar. 15, 2005

(54) METHOD FOR SELECTION OF CODING METHOD

(75) Inventor: Harri Holma, Espoo (FI)

(73) Assignee: Nokia Networks Oy, Nokia Group (FI)

( * ) Notice: Subject to any disclaimer, the term of this patent is extended or adjusted under 35 U.S.C. 154(b) by 101 days.

(21) Appl. No.: 09/609,880

(22) Filed: Jul. 5, 2000

(30) Foreign Application Priority Data

Jul. 5, 1999 (FI) ................................................. 991536

(51) Int. Cl.[7] .............................................. H04B 1/00
(52) U.S. Cl. ................ 455/63.1; 455/67.11; 455/422.1; 455/452.2; 370/465; 370/468
(58) Field of Search ................ 455/62, 63.11, 455/67.11, 135, 161.3, 277.2, 422, 452.2, 517, 63, 67.1, 67.3, 67.4; 370/332, 333, 465, 468

(56) References Cited

U.S. PATENT DOCUMENTS

| | | | | |
|---|---|---|---|---|
| 5,666,238 A | * | 9/1997 | Igari et al. ................ | 360/77.08 |
| 5,734,646 A | * | 3/1998 | I et al. ........................ | 370/335 |
| 5,818,871 A | * | 10/1998 | Blakeney et al. ........... | 375/220 |
| 5,974,106 A | * | 10/1999 | Dupont et al. .............. | 375/377 |
| 6,134,220 A | * | 10/2000 | Le Strat et al. ............. | 370/252 |
| 6,181,686 B1 | * | 1/2001 | Hamalainen et al. ....... | 370/347 |
| 6,256,487 B1 | * | 7/2001 | Bruhn ........................ | 455/352 |

FOREIGN PATENT DOCUMENTS

| | | | | |
|---|---|---|---|---|
| JP | 06 104829 A | 4/1994 | ............ | H04B/7/26 |
| JP | 06 268606 A | 9/1994 | .......... | H04N/14/04 |
| JP | 07 283 758 A | 10/1995 | ............ | H04B/1/66 |
| JP | 07 283888 A | 10/1995 | .......... | H04M/15/00 |
| JP | 11 220437 A | 8/1999 | ............ | H04B/7/26 |
| JP | 20000 69556 A | 3/2000 | ............ | H04Q/7/38 |
| JP | 2000-217144 | 8/2000 | | |

OTHER PUBLICATIONS

Translation of Notification of Reason for Rejection (and a copy in the original Japanese), Examiner K. Aoki, Japanese Patent Office, dated Aug. 29, 2003, for Japanese Patent Application 2001–508178, which corresponds to the application in this case.

* cited by examiner

Primary Examiner—William Trost
Assistant Examiner—James D Ewart
(74) Attorney, Agent, or Firm—Cohen, Pontani, Lieberman & Pavane

(57) ABSTRACT

AMR coding mode control in cellular telecommunication systems is mainly performed centrally, controlled advantageously by RNC and based on the system load or quality measurements such as FER measurements. The MS is nevertheless allowed to change the AMR mode in certain situations.

2 Claims, 3 Drawing Sheets

METHOD FOR SELECTION OF CODING METHOD

PRIORITY CLAIM

Priority is claimed under 35 U.S.C. §119 from Finnish Application No. 991536, which was filed on Jul. 5, 1999.

TECHNICAL FIELD OF THE INVENTION

The invention is related to coding mode control in cellular telecommunication systems. Particularly, the invention is directed to a method as described in the preamble of claim 1.

BACKGROUND OF THE INVENTION

The following list explains some of the abbreviations used in this specification:
AC admission control
AMR adaptive multi rate
BS base station
BTS base transceiver station
CDMA code division multiple access
C/I carrier to interference ratio
FER frame error rate
GSM general system for mobile communications
LC load control
MAC medium access control
RM radio resource manager
RRC radio resource control
RRM radio resource management
RNC radio network controller
SHO soft handover
TC transcoder
TF transport format
TFS transport format set
UE user equipment
UMTS universal mobile telecommunication system
UTRAN UMTS terrestrial radio access network
WCDMA wideband CDMA The AMR concept provides a multi rate capability for connections between a mobile station (MS) and a network. The mobile station can also be referred to as 'User Equipment' (UE). The AMR speech codec has 8 different bit rates (4.75 kbps. 12.2 kbps) for speech coding. A higher bit rate provides better speech quality but gives lower capacity and coverage. In GSM the AMR control is a link level control function, controlled by BTS. For control of downlink direction, the mobile station (MS) reports observed C/I to BTS. For control of uplink direction, the BTS measures C/I.

The present specifications of the WCDMA system leave room for improvement of the usage of the AMR concept. The present specifications do not describe adequate methods to optimize transmission control with the AMR concept.

SUMMARY OF THE INVENTION

An object of the invention is to realize a method, which avoids the problems of the prior art.

The objects are reached by arranging a network element of the cellular network to control the AMR modes of more than one mobile station together, and to adjust AMR modes in overload situations or when the system is close to overload in uplink or downlink directions.

The method according to the invention is characterized by that, which is specified in the characterizing part of the independent method claim. The dependent claims describe further advantageous embodiments of the invention.

In this invention the AMR control is mainly performed centrally, controlled advantageously by RNC and based on the system load or quality measurements such as FER measurements. Advantageously, the MS is nevertheless allowed to change the AMR mode in certain situations.

DETAILED DESCRIPTION

A. General Considerations

According to the invention, the AMR mode control is mainly performed in a central fashion. The mobile station is preferably allowed to adjust the AMR mode in certain situations. The AMR modes can be changed in the following exemplary ways:

If the load gets too high, the AMR bit rates of the existing speech connection can be lowered.

If the load gets too high, the AMR bit rates of the new starting speech connections can be set to lower values.

The load measurement that is used in the AMR adaptation decision can be the load of a single cell and the load of the adjacent cells can be also taken into account.

If the uplink quality gets too bad (e.g. too high FER), the uplink AMR mode can be lowered.

Preferably, RNC is the network element that controls these changes of the AMR modes. The default AMR bit rate can be set by the operator on a cell basis. The uplink and downlink AMR modes and their control can be completely independent.

According to current specifications of the WCDMA system, the transcoder (TC) is located in the core network.

Figure 1:
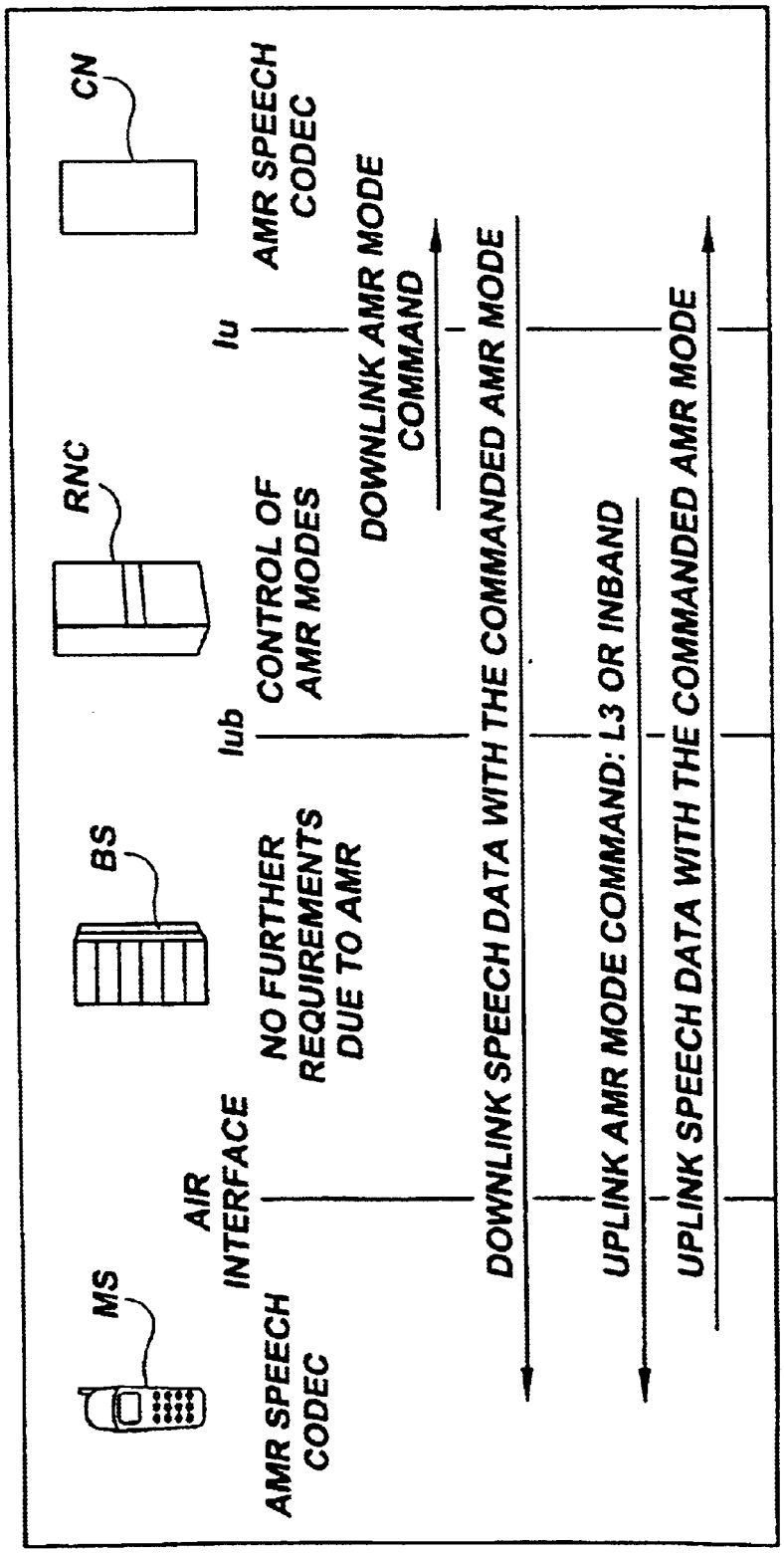
FIG. 1 illustrates AMR mode control according to an advantageous embodiment of the present invention.

As shown in FIG. 1, control of AMR modes according to a preferred embodiment of the present invention is advantageously located in the controlling RNC. The RNC controls the downlink AMR mode by sending AMR mode control commands to the transcoder unit in the core network, and the uplink AMR mode by sending AMR mode control commands to the mobile station.

Figure 2:
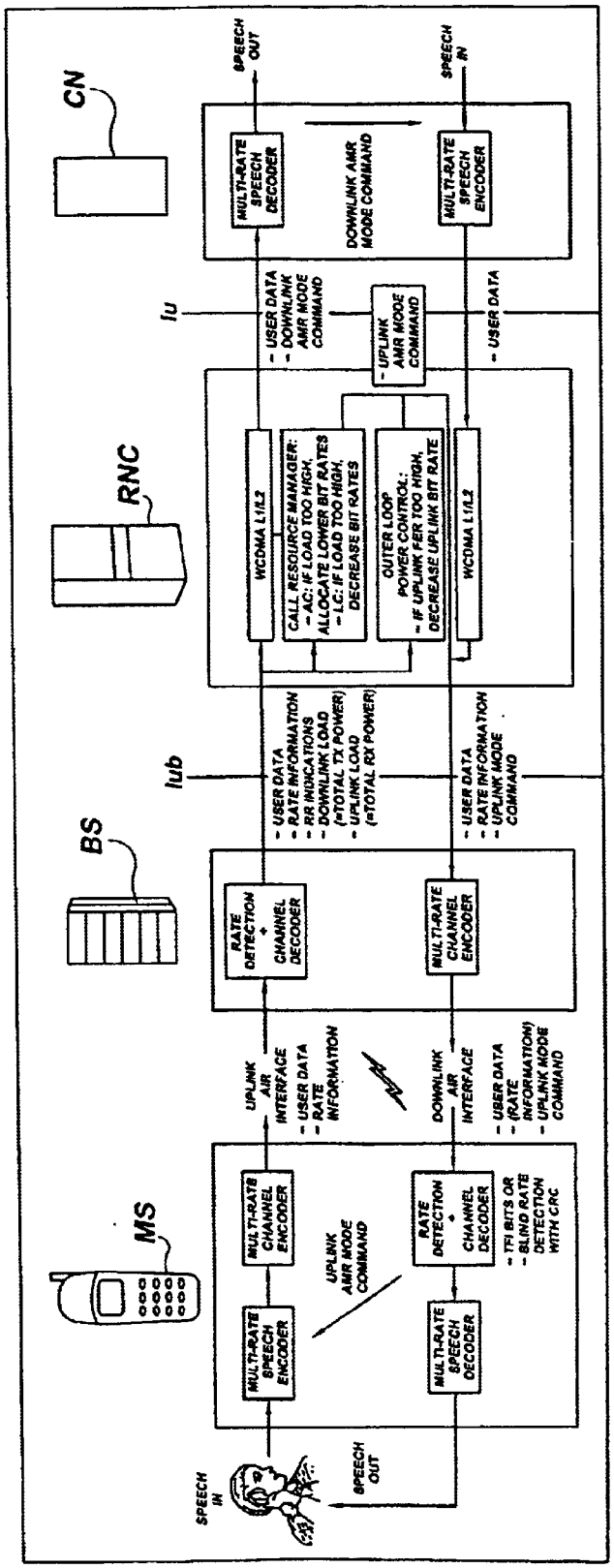
FIG. 2 illustrates in a more detailed way AMR mode control according to an advantageous embodiment of the present invention.

As shown in FIG. 2, the code mode control according to a preferred embodiment of the present invention can be within RNC in outer loop power control and/or the cell resource manager, i.e. in admission control and load control functions. Preferably, the control is realized within radio resource management (RRM) functions. The AMR mode adapatation can be asymmetric, i.e. different AMR modes can be used in uplink and downlink during a single connection.

Preferably, the load situation is the basis for AMR mode control: for downlink, BS reports total BS transmission power, and for uplink, BS measures total interference power at the BS. The RNC performs AMR mode control based on this information. Also the Uplink FER can be used in AMR mode control.

B. An Example of a Control Algorithm

In this section, a particular example of a control algorithm is described. According to this algorithm, the AMR mode is set by the admission control function in the RNC. This section only lists some examples, and does not limit other embodiments of the invention in any way.

The cell RM can detect when the system load is getting close to the admission control blocking threshold. In that case the admission control allocates lower bit rates to the new AMR users to provide a higher capacity. This algorithm advantageously works on a cell basis. In this embodiment, the AMR mode is not modified during the connection due to load considerations. Adaptation of the algorithm according to this embodiment is rather slow, and in practice it takes several minutes after the cell load has increased over a limit before most of the AMR connections have lower bit rates. This adaptation speed depends on the average length of the speech connections. Therefore, this method can be considered to form an automatic detection of busy hours on a cell basis. A possible admission control algorithm could be as follows:

Step (1)
If (Estimated_blocking>'AMR_blocking_limit')
 decrease the AMR bit rate of all incoming AMR users by 'AMR_step' number of AMR modes in that transmission direction
 go to step (4)
Step (2)
If (Estimated_blocking=0)
 increase the AMR bit rate of all incoming AMR users by 'AMR_step' number of AMR modes in that transmission direction
 go to step (4)
Step (3)
If no actions in (1) or in (2), go to step (5)
Step (4)
Wait until 'AMR_change_percentage' % of the speech connections in the cell are using the new AMR mode.
Step (5)
Calculate Estimated_blocking:
 estimate for each RR indications if a new AMR user would be blocked or not. We can assume here simply that the user would be blocked if Prx_nc>Prx_target (=no power increase estimation). For AMR users the power increase is quite small in any case.
 average for 'AMR_average' seconds the blocking probability, e.g. 30 s
 calculate Estimated_blocking=estimated_blocked_RRIs/total_number_RRIs
Step (6)
Go back to step (1)

This procedure is preferably separate for uplink and for downlink. Therefore, it is possible that downlink connections use lower AMR modes than uplink connections if the load in the downlink direction increases near overload before that happens in the uplink direction.

The parameters in the previous example are as follows:

| Parameter | Description | Example values |
|---|---|---|
| AMR_blocking_limit | The maximum estimated blocking percentage before AC allocates lower AMR modes | 2% |
| AMR_change_percentage | AC waits until this percentage of the AMR users in that cell are using the new AMR mode before further | 50% |

-continued

| Parameter | Description | Example values |
|---|---|---|
| | actions | |
| AMR_average | The averaging period in estimating the blocking percentage | 30 s |
| AMR_step | The number of AMR mode steps that AC adjusts at one time | 1 AMR mode |

C. A Further Example of a Control Algorithm

In this section, a particular example of a control algorithm is described. According to this algorithm, the AMR mode can also be changed by the load control function in the RNC. This section only lists some examples, and does not limit other embodiments of the invention in any way.

In this embodiment the admission control estimates how much the total load could be decreased if all AMR users change to their lowest bit rate. In other words, instead of blocking a new user, the admission control assumes that the existing AMR users can lower their bit rate, and thus admit a higher number of users in the system. A new user is admitted by the uplink admission control if $$P_{rx,NC} + \Delta P_{rx,new} < P_{rx,target} \quad (1)$$

where $P_{rx,NC}$ is the non-controllable load.

The non-controllable load consists of the interference from
 intra-cell real time users,
 intra-cell non-real time users with their guaranteed minimum bit rate, and
 inter-cell users.

The non-controllable load cannot be affected by the packet scheduler of this particular cell. Note that only the minimum bit rate of AMR is assumed to be non-controllable.

$$\Delta P_{rx,new} = \frac{\Delta L}{1 - (\eta - L_{NRT} - L_{AMR}) - \Delta L} P_{rx,total} \quad (2)$$

where
$\Delta L$=load increase from the new user,
$L_{NRT}$=load from best effort packet users (obtained from the packet scheduler in RNC), and
$L_{AMR}$=the maximum decrease in the load from AMR users if their bit rate is decreased to the minimum. This term then reflects the flexibility of bit rates of AMR users. The current bit rates of AMR uses are preferably kept in a table in cell resource manager.

$$L_{AMR} = \sum_{i=1}^{N} \left( \frac{1}{1 + \frac{W}{\rho_{i,used} R_{i,used}}} - \frac{1}{1 + \frac{W}{\rho_{i,minimum} R_{i,minimum}}} \right) \quad (3)$$

where
$\rho_{i,used}=E_b/N_0$ for the used AMR bit rate,
$\rho_{i,minimum}=E_b/N_0$ for the minimum AMR bit rate,
$R_{i,used}$=the used AMR bit rate, and
$R_{i,minimum}$=the minimum AMR bit rate='AMR_min_mode'.

In order to implement this modified admission control we need to
 obtain the current bit rates of AMR users (=$R_{i,\,used}$)

obtain the minimum allowed bit rates of AMR users (=$R_{i, minimum}$='AMR_min_mode'), and calculate $L_{AMR}$.

In downlink admission control similar principles can be applied as in uplink.

If the admission control assumes that the AMR bit rates can be lowered, that option must be then supported by the load control. In the load control it is quite simple to decrease the AMR bit rate in case of overload. However, it is difficult to decide when the AMR bit rate can be increased in case of SHO. In SHO the load control should check the loading in all SHO branches before increasing the AMR bit rate. That requires that there is signalling between the cell RMs of neighboring cells. This signalling causes additional load to the RNC, and is therefore not desirable.

One simplified approach here is that the load control would only decrease the AMR bit rates but never increase them back during the connection. This approach would not need the signalling between cell RMS of SHO branches.

In another simplified version each AMR connection is kept in a list only in one cell's RM. That would make it easier to handle SHO users. The load control algorithm could then only affect the AMR mode of those users who are listed in that cell. Other AMR users are seen as non-controllable traffic from this cell's point of view. Also, the admission control could then take only those AMR users into account that can be controlled by that cell. If we assume that soft handover overhead is 30%, then in this simplified approach, we could modify the AMR mode of 1/1.3=77% of users in each cell. The rest of AMR users (23%) would then be as non-controllable users.

It is assumed here that the cell resource manager in RNC keeps a list of the bit rates of the AMR users in that particular cell. That list can be used in the admission control and in the load control algorithms.

Figure 3:
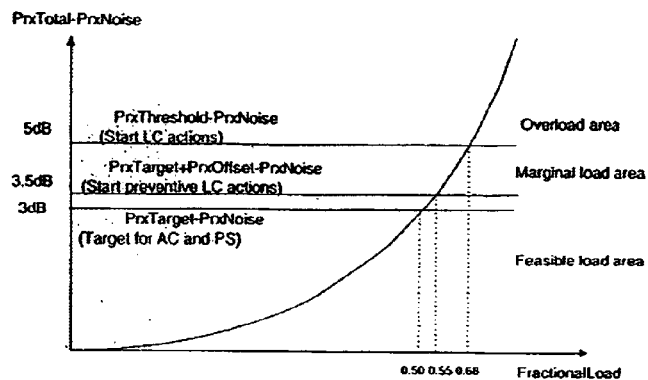
FIG. 3 illustrates load thresholds in an advantageous embodiment of the present invention.

The uplink load control thresholds are shown in FIG. 3. For real-time services the preferred actions when the system is in overload in the uplink direction are:

PrxTotal>PrxTarget+PrxOffset: freeze the outer loop setpoint

PrxTotal>PrxThreshold: lower the outer loop setpoint, start controlled dropping

In the downlink direction:

PtxTotal>PtxTarget+PtxOffset: no actions

PtxTotal>PtxThreshold: start controlled dropping

When multi rate connections are used, the highest bit rates can be used when there is no overload. In case of overload, the load control actions can be as follows:

In the uplink:

PrxNC>PrxTarget+PrxOffset: lower AMR bit rates

PrxNC<PrxTarget: increase AMR bit rates

In the downlink:

PtxNC>PtxTarget+PtxOffset: lower AMR bit rates

PtxNC<PtxTarget: increase AMR bit rates where PrxNC and PtxNC is the non-controllable load. The idea is to lower the AMR bit rates before ending up in an overload state. The margin between PrxTarget+PrxOffset and PrxTarget is a hysteresis that is needed to prevent unnecessary jumping between the modes.

The AMR bit rates are first decreased from speech users:

in uplink, who have the highest load factor, and in downlink, who have the highest transmission power per connection.

Those speech users are the ones who are causing the highest interference.

D. A Further Example of a Control Algorithm

In this section, a particular example of a control algorithm is described. According to this algorithm, the AMR mode can also be changed by the outer loop load control function in the RNC. This section only lists some examples, and does not limit other embodiments of the invention in any way.

It is possible that some links experience bad quality due to coverage reasons even if the system is not in overload. One possibility is to let the mobile change its uplink mode without any network commands if it is running out of power. This would require standardization among manufacturers. If this feature is in all mobiles, then the coverage extension by AMR will be available in all manufacturers' WCDMA networks and it cannot be used as a differentiating factor.

Figure 4:
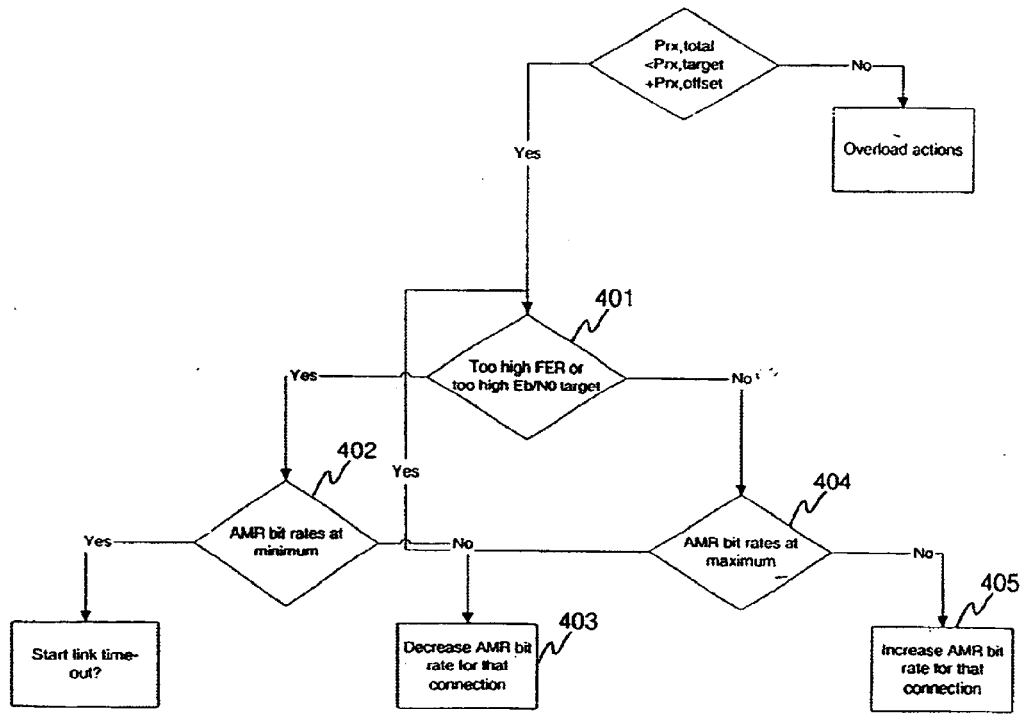
FIG. 4 illustrates a further advantageous embodiment of the present invention.

If it is required that it is always the network that decides the uplink AMR mode, the uplink outer power loop control is needed to ask to lower the AMR bit rate to improve the uplink coverage. The actions of the outer loop power control are shown in FIG. 4. Note that the uplink connection always gets the required FER if there is enough power in the mobile station to follow the power control commands and there is no overload in uplink.

The outer loop power control algorithm could be for example as follows:

Step (1)

calculate the average FER over the period of 'AMR_FER_aaverging length'

Step (2)

if it is found in step 401 that the average FER>'AMR_FER_max_uplink' and in step 402 that the current AMR mode>'AMR_min_mode', decrease AMR mode for uplink at step 403 by 'AMR_step' number of AMR modes if it is found in step 401 that the average FER<,'AMR_FER_acceptable' and in step 404 that the current AMR mode <12.2 kbps, increase AMR mode for uplink at step 405 by 'AMR_step' number of AMR modes a quick reaction is obtained if AMR mode is lowered immediately, if more than 'AMR_FER_max_uplink'* 'AMR_FER_averaging_length' errors are received in less than 'AMR_FER_avering_length'. For example, with values of 3% and 5 s (and 50 frames per second), if more than 7.5 (=0.03*50*5) errors are received in less than 5 s, a lower AMR mode is used. This makes it possible to react fast to bad quality in an error burst due to coverage.

Step (3)

go to Step (1)

Note that the outer loop PC must keep a list of the current AMR bit rates of those connections that it is controlling.

The parameters of the previous example are the following:

| Parameter | Description | Example values |
| --- | --- | --- |
| AMR_FER_averaging_length_uplink | The averaging length for calculating the uplink FER | 5 s |
| AMR_FER_max_uplink | If the uplink FER exceeds this value, the mobile is commanded to a lower AMR mode | 3% |
| AMR_FER_acceptable_uplink | If the uplink FER is lower than this value, the mobile is commanded to a higher AMR mode | 1.5..2 × outer loop FER target e.g. 1.5% |
| AMR_step | The number of AMR modes that are adjusted at one time | 2 AMR modes (= 12.2 → 7.95 → 6.7 → |

-continued

| Parameter | Description | Example values |
|---|---|---|
| | | 5.15) |

The values for the parameters need to be optimized depending on the MOS vs. FER behavior of the AMR speech codec. That optimization depends, e.g., on the chosen unequal error protection on L1. The operator must also set the maximum power per downlink speech connection so that it supports the range extension provided by the uplink AMR adaptation.

E. Signalling of the AMR Mode Command

Signalling of the AMR mode command can be performed in various ways, inband as well as outband. Some ways of signalling the AMR mode according to certain advantageous embodiments of the invention are described in the following.

In a further advantageous embodiment of the invention, inband signaling is used for the AMR mode control. In this embodiment, information about the new AMR mode to be used is sent to the encoder along with user data.

Coupling of an AMR mode control message into user data can be performed advantageously on the MAC layer.

Inband signalling has certain advantages. For example, no separate signalling procedure needs to be created between the RRC functions in the RNC and the transcoder. Further, inband signaling provides a quick way to change the AMR mode. Inband signaling is also supported in the present GSM system.

If outband signaling is used, the AMR mode command is sent in a separate signalling message. The signaling can be effected for example using the RRC layer. The use of the RRC layer for the adaptation of downlink AMR mode requires new signalling procedures between the RNC and the transcoder in the core network. Existing signalling procedures can be used for uplink AMR mode control. One example of a procedure that can be used for uplink AMR mode control is the TRANSPORT CHANNEL RECONFIGURATION procedure.

Outband signalling has certain advantages. For example, when outband signalling is used, no AMR mode command generation is needed on the MAC layer. Further, transmission of signaling information on the user plane increases complexity, since user plane is meant to be used for user data only. For the uplink direction, already defined RRC procedures can be used.

F. A Further Class of Advantageous

In a further class of advantageous embodiments of the invention, the MS is allowed to control the AMR mode in certain situations. For example, it is advantageous if the MS is able to change the AMR mode when the conditions on the air interface have changed and an AMR mode change needs to be performed quickly to save proper quality on a speech connection.

In one advantageous embodiment, the MS is allowed to change uplink AMR mode if the maximum transmission power level of the MS is reached. Since the MS cannot increase the transmission power any more, the MS can maintain the quality of a speech connection in deteriorating radio interface conditions by changing to an AMR mode, which provides a lower speech data rate. Preferably, the MS is not required to request a mode change from RNC.

Advantageously, the set of AMR modes the MS is allowed to change to consists of those AMR modes, which are represented in the transport formats of the currently valid transport format set.

Since the transport format set is decided by the network and specified to the MS by the network, the network can set the limits for the selection of the applicable AMR modes. The network discovers the AMR mode used by the MS from rate information, which is sent by the MS along with the user data.

A transport format (TF) is a set of parameters, which correspond to a single way of preparing a payload data stream for transmission over the air interface. The set of parameters indicate for example payload data rate, the error control coding method used, interleaving method used, and other processing methods used in the particular cellular telecommunications network, i.e. describe the physical layer processing applied to the data to be transmitted. Consequently, each TF corresponds to a specific instantaneous bearer bit rate. Further, each bearer has at least one transport format. In the case of a bearer supporting for example multiple bit rates, a bearer can have more than one corresponding TF.

Each transport format has a corresponding transport format identifier (TFID). The TFIDs can be assigned to TFs in many ways, for example in ascending order starting from the lowest bit rate, or according to some other predefined rule.

The combination of transport formats of the active bearers is a Transport Format Combination (TFC). The set of all possible transport format combinations form a Transport Format Combination Set (TFCS). Each TFC has a corresponding transport format combination identifier (TFCI), i.e. each TFCI corresponds to a definite group of transport formats. The TFCI is used to inform the current combination of transport formats to the receiver.

The mechanism in which the MS changes the AMR mode can advantageously be used to extend the coverage area of a speech connection. If the MS cannot increase transmission power any more, it can change the AMR mode to a mode which provides a lower data rate, thereby maintaining the quality of the speech connection even if the MS moves further away from the base station.

In an advantageous embodiment of the invention a method for selection of the coding method for a multi rate connection between a MS and a network in a digital cellular telecommunication system is provided. According to this embodiment, in certain circumstances the MS selects the coding method, and in other circumstances the network selects the coding method. Preferably, the selection of the coding method in the network is performed by a radio network controller. Advantageously, the MS selects the coding method, if the MS uses its maximum transmission power.

In a further advantageous embodiment of the invention a method for increasing the apparent radius of a cell as observed by an MS having a multi rate connection to a cellular network is provided. According to this embodiment, the coding method used for a connection of the MS is controlled on the basis of transmission power of the MS and the load of at least one cell. Preferably, the coding method used by the MS is changed, if the quality of the radio interface deteriorates and the MS uses its maximum transmission power. Advantageously, the MS selects the coding method.

G. Further Considerations

In a further advantageous embodiment of the invention, change of AMR mode is coupled with changing of the transport format.

The invention allows the increase of connection coverage area, as well as capacity and quality of connections.

The name of a given functional entity, such as the radio network controller, is often different in the context of different cellular telecommunication systems. For example, in the GSM system the functional entity corresponding to a radio network controller (RNC) is the base station controller (BSC). Therefore, the term radio network controller in the claims is intended to cover all corresponding functional entities regardless of the term used for the entity in the particular cellular telecommunication system. Further, the various message names such as the AMR MODE COMMAND message name are intended to be examples only, and the invention is not limited to using the message names recited in this specification.

The present invention can be utilized in many different cellular networks such as the third generation cellular network presently under development. For example, the invention can be utilized in the WCDMA system.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for selection of coding modes for a multi rate connection between a mobile station and a digital cellular communication network, comprising the steps of:

determining, by a mobile station, a new uplink coding mode when the mobile station determines that a reduction in resource consumption is optimal for the mobile station; and determining, by the digital cellular communication network, new coding modes independently from when the mobile station determines that a reduction in resource consumption is optimal for the mobile station, wherein the digital cellular communication network uses an admission control function in a radio network controller to determine at least a portion of the new coding modes.

2. A method for selection of coding modes for a multi rate connection between a mobile station and a digital cellular communication network, comprising the steps of:

determining, by a mobile station, a new uplink coding mode when the mobile station determines that a reduction in resource consumption is optimal for the mobile station; and determining, by the digital cellular communication network, new coding modes independently from when the mobile station determines that a reduction in resource consumption is optimal for the mobile station, wherein the digital cellular communication network uses an outer loop load control function in a radio network controller to determine at least a portion of the new coding modes.

* * * * *